Oct. 4, 1960 P. C. HOSKING ET AL 2,955,232
CIRCUIT FOR UNBALANCE DETECTION APPARATUS
Filed Oct. 30, 1958
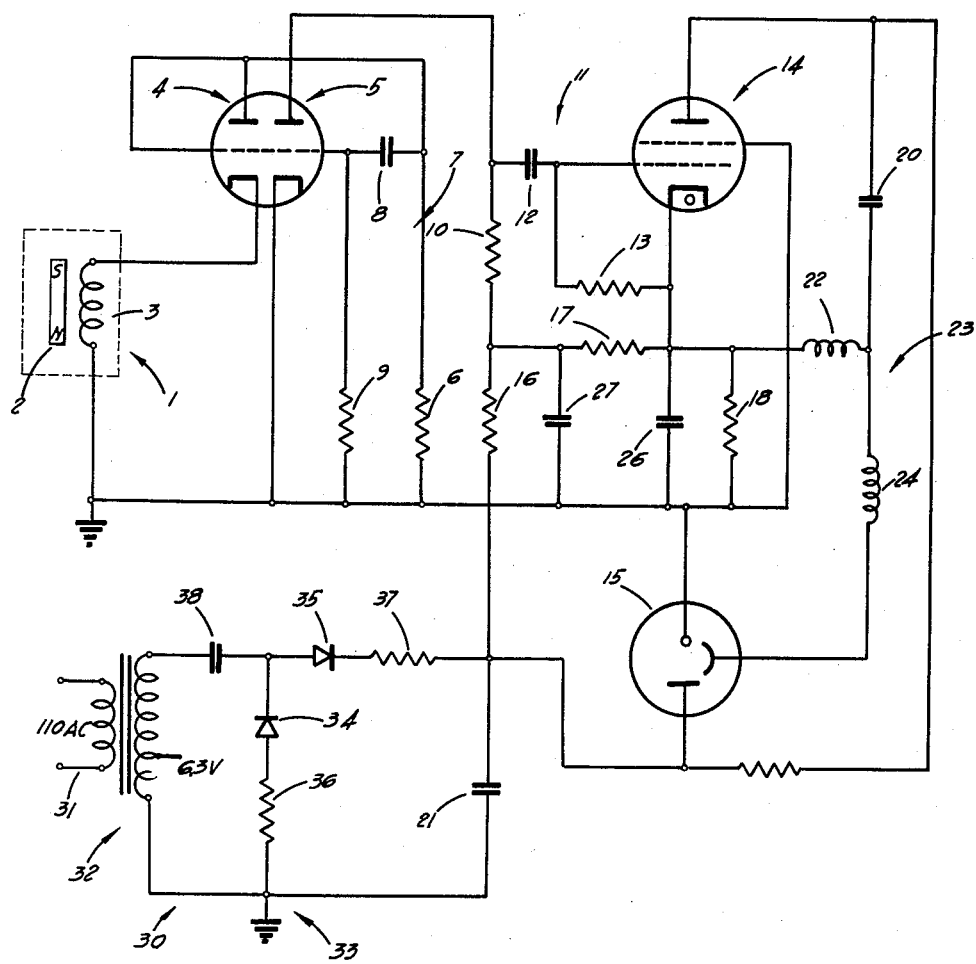
INVENTORS
Paul C. Hosking
Oleg Szymber.
By John C Black.
Attorney

United States Patent Office 2,955,232
Patented Oct. 4, 1960

2,955,232

CIRCUIT FOR UNBALANCE DETECTION APPARATUS

Paul C. Hosking, Wilmette, and Oleg Szymber, Wood Dale, Ill., assignors to Stewart-Warner Corporation, Chicago, Ill., a corporation of Virginia Filed Oct. 30, 1958, Ser. No. 770,815

3 Claims. (Cl. 315—183)

The present invention relates to apparatus for detecting the position and amount of unbalance in vehicle wheels while the wheels are mounted on the vehicle and more particularly to an improved circuit for operating a stroboscopic device in such apparatus in synchronism with deflection of the wheels caused by unbalance therein.

This type apparatus is generally referred to as "on-the-wheel" balancing apparatus and is of the type shown in United States Patent No. 2,383,405, issued August 21, 1945, to Merrill. In apparatus of this type, the wheel of the vehicle to be checked for unbalance is raised off the ground by any suitable means, for example a jack, to permit free rotation thereof. A spinner is then brought into engagement with the wheel and the wheel is rotated to a speed in excess of its natural resonant frequency. The spinner is then disengaged from the wheel to permit the wheel to decelerate. As the freely rotating and decelerating wheel passes through its resonant frequency, an amplitude meter indicates a maximum deflection due to unbalance in the wheel. Thus an operator is apprised of the time interval during which the wheel rotates at resonance.

It is a well known physical phenomenon that at resonance the deflection due to unbalance lags the locus of unbalance by 90 degrees. Hence, if a stroboscopic device is operated in synchronism with the rotation of the wheel as it is rotated at its resonant frequency, the locus of unbalance may be determined in relation to the deflection. It will be apparent that the stroboscopic device must be operated consistently at a predetermined instant during each cycle, that is revolution of the wheel, in relation to the deflection of the wheel which is detected.

As described in said Merrill patent, an electromagnetic pickup unit is used to produce an electrical signal in response to the deflection cycle. This signal operates the stroboscopic device. However, inasmuch as the deflection follows a generally sinusoidal wave form there must be some means, either in the pickup or in the circuit associated therewith, for causing the stroboscopic device to be operated for a very short time interval at a precise point on the wave form. In the preferred embodiment of the present invention, and in the Merrill patent, the pickup is an electromagnetic voltage generator which produces a sinusoidal voltage output in response to the sinusoidal deflection pattern. Consequently, a circuit must be provided for selecting a precise position in said sinusoidal voltage wave form for applying a control firing pulse to the stroboscopic device.

The present invention is directed to this circuit for firing the stroboscopic device. The circuit of the present invention is greatly reduced in cost yet displays improved operating characteristics. An earlier, more complex circuit is shown in U.S. Patent No. 2,521,141 issued September 5, 1950, to Allen.

Accordingly, it is the primary object of the present invention to provide an improved circuit means for operating a stroboscopic device in synchronism with a cyclically moving object.

Other objects and the various features of the invention will be appreciated upon a perusal of the following description taken in conjunction with the accompanying drawing which discloses the improved operating circuit for the stroboscopic device.

An electromagnetic voltage generating pickup unit 1 is provided, which unit may be one generally similar to that shown in the Merrill patent. Briefly, the pickup 1 includes a permanent magnet assembly 2, which is connected in any convenient manner with the vehicle wheel (not shown) which is being checked for unbalance. Hence, the magnet 2 will reciprocate incident to vibration of the wheel caused by unbalance.

It will be appreciated that in actual practice the magnet will be vibrating in one plane when the wheel is being checked for static unbalance and will be vibrating in second plane normal to the first plane when the wheel is being checked for dynamic unbalance. In either event, the magnet 2 reciprocates relative to an associated stationary coil 3 to induce a voltage therein which is a direct function of the magnitude of the deflection caused by unbalance.

Since in any electromagnetic generator, the instantaneous generated potential is a function of the rate of change of flux in the coil, the voltage generated in coil 3 will reach positive and negative peaks as the deflection passes through the center of the reciprocable cycle of the magnet 2. Hence, the voltage peaks generated in coil 3 will occur as the locus of unbalance is in line with reciprocable path of the magnet.

The output of the coil 3 is connected to one section 4 of a twin triode tube, such as a 12AX7. This section 4 has its grid and plate interconnected so that it operates as a diode. Hence, the diode section 4 passes only the negative half cycles of the voltage produced in the coil 3. These half cycles correspond to a predetermined direction of deflection movement of the wheel being balanced, for example from bottom to top with respect to the drawings. As the voltage peak is reached, the locus of unbalance is therefore at the top of its cycle in line with the magnet 2.

The output of the diode section 4 is connected to the grid of the second or amplifier section 5 of the twin triode tube by way of a load resistor 6 and a circuit 7 comprising a capacitor 8 and a resistance 9. The circuit 7 acts as a type of automatic gain control which permits only the tips, or pulses, in the region of maximum amplitude of the negative half cycles pass to the next succeeding stage. The circuit 7 passes that portion of the negative half cycle which is within a predetermined small voltage differential from the maximum pickup voltage of the half cycle. Hence, the width in a cycle of the passed tip will depend upon the magnitude of the half cycle pulse and the sharpness of the pulse at the peak; but, in any event, the width of this tip is exceedingly small, in the order of 4 degrees when one of the commercially available pickup units is utilized. Since this tip coincides with the voltage peak generated by the coil 3, this tip lags the locus of unbalance by 90 degrees.

The amplifier section 5 amplifies the tips appearing at the circuit 7. The pulse from the ampliper section 5 is applied across its plate load resistor 10.

A peaking or differentiating circuit 11 comprising a coupling capacitor 12 and a grid leak resistor 13 couples the output of the amplifier section 5 to the control grid of a thyratron 14. The thyratron may be one of a number of commercially available tubes, for example, a 2D21. The differentiator circuit 11 will apply a very high spiked voltage pulse to the grid of the thyratron 14. This spiked peak will appear substantially at the leading edge of the output pulse from the amplifier section 5. This leading edge of the amplifier section pulse substantially coincides with the negative half cycle tip appearing at the automatic gain control circuit 7. Hence, the spiked pulse applied to the thyratron 14 is substantially at the center of the peak of the negative half cycle passed by the diode section 4.

Consequently, it can be seen that the application of the firing pulse to the thyratron 14 occurs at a predetermined instant in time with respect to the cycle of deflection caused by unbalance and, therefore, in predetermined relationship to the instantaneous position of the locus of unbalance. The operation of the thyratron 14 and its associated circuits for firing a stroboscopic device 15 will now be described in detail.

A voltage divider network comprising resistors 16, 17 and 18 develop across the resistor 18 a fixed positive cathode to ground potential for the thyratron 14. The suppressor grid of the thyratron is grounded and therefore is biased negatively with respect to the cathode. A bias stabilizing capacitor 26 is connected across the resistor 18. This negative bias potential at the suppressor grid normally holds the thyratron 14 in its nonconducting state. The control grid of the thyratron is normally maintained at cathode potential. The spike pulse of the differentiating circuit 11, when applied to the grid of the thyratron 14, causes the latter to fire. At the end of this spiked pulse, the thyratron bias returns below cutoff and the thyratron is extinguished by virtue of its low plate voltage which occurs upon conduction by the thyratron.

A pulse initiating capacitor 20, connected in the plate circuit of the thyratron 14, charges itself during periods of nonconduction by the thyratron. At the same time, voltage supply capacitor 21 is also charged. When the thyratron fires for a short time interval as described above, the plate voltage falls rapidly due to the low resistance path in the thyratron 14 and the capacitor 20 discharges through the thyratron.

The capacitor 20 discharges through the thyratron by way of the primary winding 22 of a pulse transformer 23, thereby to induce a high peaked voltage in the secondary winding 24 of the transformer. This secondary winding pulse is applied to the control element of the stroboscopic device 15 to cause the gas in the device 15 to ionize. The voltage supply capacitor 21 now discharges through the low resistance stroboscopic device 15 to produce a brilliant high intensity, short time duration flash of light.

It will be recalled that the spiked peak of the differentiating circuit 11 is of a very short time duration and has a definite cyclic relationship with the instantaneous position of the locus of unbalance. Since the thyratron 14 runs substantially instantaneously to saturation, the capacitor 20 discharges through the transformer 23 at almost the same instant in time as the spiked pulse. The transformer 23 provides a highly peaked short time duration output pulse at the control element of the stroboscopic device 15 with little time lag. Commercially available stroboscopic devices operated by a high potential supply capacitor, as shown by the applicants, will reach a high light intensity with almost no time lag. Hence, the high intensity flash of light will have a definite fixed time relationship with the instantaneous position of the locus of unbalance in the wheel being checked. Accordingly, when the wheel is visually observed in an apparent "at rest" position by means of the stroboscopic device 15, the locus of unbalance will be in a predetermined angular position. This position in the preferred embodiment appears above and in line with the magnet 2.

The resistor 16 also is effective to isolate the amplifier 5 from the current surge in the stroboscopic device 15. A capacitor 27 effectively prevents feedback from the device 15 to the amplifier 5.

An improved power supply circuit 30 cooperates in a unique manner with the apparatus to provide lower cost and improved performance, and to prevent the operation of the stroboscopic device 15 under certain conditions.

A conventional 110 volt alternating current supply is applied to an isolating step-up transformer 32. A voltage doubler circuit 33 is connected to the output of the transformer 32. The circuit 33 includes a pair of semiconductors 34 and 35, a pair of current limiting resistors 36 and 37, an intermediate storage capacitor 38, and the supply capacitor 21. The resistors 36 and 37 may be ten and five hundred ohms respectively; the capacitors 38 and 21, sixteen microfarads.

The semiconductors 34 and 35 are polarized so as to charge the capacitor 38 during one half cycle of the alternating current supply and to discharge the capacitor 38 into the capacitor 21 during the other half cycle. The discharge of the capacitor 38 into the capacitor 21 is in aiding relationship with the voltage produced in the transformer secondary during the latter half cycle. Hence, the voltage across capacitor 21 is double the output voltage of the transformer 32, for example three hundred volts.

The values of the resistance 37 and the capacitor 21 are adjusted to provide a long charging time constant. This very simply yet effectively prevents the firing of the stroboscopic device at undesired high frequencies. It is not until the capacitor 21 has been charged to the minimum required operating voltage of the device 15 that it can operate.

The operation of the circuit will now be described. The magnet 2 is reciprocated in synchronism with the wheel deflection caused by unbalance. The magnet 2 induces a voltage having a sine wave characteristic into the coil 3. The diode 4 passes only the negative half-cycles of the induced voltage. The circuit 7 passes only the peaks of the negative half cycles to the amplifier 5.

The amplifier 5 amplifies each peak. The output of the amplifier 5 is shaped into spiked peaks by the circuit 11 and applied to the thyratron 14.

The thyratron 14 fires to cause the control capacitor to discharge through the thyratron and the primary winding 22 of the pulse transformer 23. A high voltage is induced in the secondary winding 24 and is applied to the control element of the device 15 to cause the latter to fire.

While there has been described what is at present believed to be the preferred embodiment of the invention, it will be understood that various changes and modifications may be made therein; and it is contemplated to cover in the appended claims all such changes and modifications as fall within the true spirit and scope of the invention.

What is claimed is:

1. In an electronic circuit for triggering a stroboscopic device in definite phase relation with alternating currents of substantially sinusoidal waveform at frequencies below a predetermined value, the combination including a diode energized by the current to pass pulses of one polarity, a single stage amplifier, an automatic gain control circuit interconnecting the diode and the amplifier to apply only the peak of each pulse passed by the diode to the amplifier for amplification thereby, a thyratron including a cathode, an anode and control and suppressor grids, a differentiating circuit connecting the amplifier and the control grid and energized by each amplified pulse to produce a high spiked pulse at the leading edge of each amplified pulse to initiate conduction by the thyratron, a first capacitor and a primary winding of a pulse transformer series connected across the cathode and the anode, means including a power supply charging the capacitor during periods of non-conduction by the thyratron and permitting operation of the amplifier and thyratron, the capacitor discharging rapidly through the winding and thyratron incident to conduction by the thyratron, a secondary winding of the pulse transformer connected to the control grid of the stroboscopic device producing a highly peaked pulse incident to the discharge of the capacitor through the primary winding, a second capacitor, and power supply having output terminals connected across the anode and cathode of the stroboscopic device and across the second capacitor and including means for slowly charging the second capacitor during periods of non-conduction by the stroboscopic device at a rate in the order of the reciprocal of the predetermined frequency, the second capacitor discharging through the stroboscopic device incident to the application of the pulse to the grid of the stroboscopic device, the discharge of the second capacitor causing momentary decay of the power supply voltage at the terminals to assure extinguishing of the thyratron and the stroboscope and substantially lowering the plate voltage of the amplifier to substantially prevent cyclical operation of the stroboscopic device by currents having frequencies above the predetermined value or by spurious currents.

2. In an electronic circuit for triggering a stroboscopic device in definite phase relation with an alternating current of substantially sinusoidal waveform at frequencies below a predetermined value, the combination including a diode energized by the current to pass pulses of one polarity, a single stage amplifier, an automatic gain control circuit interconnecting the diode and the amplifier to apply only the peak of each pulse passed by the diode to the amplifier for amplification thereby, a thyratron including a cathode, an anode and control and suppressor grids, a first capacitor and a primary winding of a pulse transformer series connected across the cathode and the anode, means including a power supply having output terminals charging the capacitor during periods of non-conduction by the thyratron and permitting operation of the amplifier and thyratron, a voltage divider circuit connected across the power terminals and to the cathode and suppressor grid to provide a positive cathode bias and a suppressor grid bias which is negative with respect to the cathode bias, a differentiating circuit connecting the amplifier and the control grid and energized by each amplified pulse to produce a high spiked pulse at the leading edge of each amplified pulse to initiate conduction by the thyratron, the capacitor discharging rapidly through the winding and thyratron incident to conduction by the thyratron, a secondary winding of the pulse transformer connected to the control grid of the stroboscopic device producing a highly peaked pulse incident to the discharge of the capacitor through the primary winding, a second capacitor, the output terminals of the power supply connected across the anode and cathode of the stroboscopic device and across the second capacitor, the power supply including means for slowly charging the second capacitor during periods of non-conduction by the stroboscopic device at a rate in the order of the reciprocal of the predetermined frequency, the second capacitor discharging through the stroboscopic device incident to the application of the pulse to the grid of the stroboscopic device, the discharge of the second capacitor causing momentary decay of the power supply voltage at the terminals to assure extinguishing of the thyratron and the stroboscope and substantially lowering the plate voltage of the amplifier to susbtantially prevent cyclical operation of the stroboscopic device by currents having frequencies above the predetermined value or by spurious currents.

3. In an electronic circuit for triggering a stroboscopic device in definite phase relation with an alternating current of substantially sinusoidal waveform at frequencies below a predetermined value, the combination including a diode energized by the current to pass pulses of one polarity, a single stage amplifier, an automatic gain control circuit interconnecting the diode and the amplifier to apply only the peak of each pulse passed by the diode to the amplifier for amplification thereby, a thyratron including a cathode, an anode and control and suppressor grids, a first capacitor and a primary winding of a pulse transformer series connected across the cathode and the anode, means including an alternating current power supply having output terminals charging the capacitor during periods of non-conduction by the thyratron and permitting operation of the amplifier and thyratron, a voltage divider circuit connected across the power supply terminals and to the cathode and suppressor grid to provide a positive cathode bias and a suppressor grid bias which is negative with respect to the cathode bias, a differentiating circuit connecting the amplifier and the control grid and energized by each amplified pulse to produce a high spiked pulse at the leading edge of each amplified pulse to initiate conduction by the thyratron, the capacitor discharging rapidly through the winding and thyratron incident to conduction by the thyratron, a secondary winding of the pulse transformer connected to the control grid of the stroboscopic device producing a highly peaked pulse incident to the discharge of the capacitor through the primary winding, a second capacitor, the output terminals of the power supply connected across the anode and cathode of the stroboscopic device and across the second capacitor, the power supply including a semiconductor, a current limiting resistor and a third capacitor series connected to charge the third capacitor during one-half cycle of the supply current and a second semiconductor, a second current limiting resistor, the third capacitor and the second capacitor series connected to transfer the charge in the third capacitor to the second capacitor in series with the other half cycle of supply current charging the second capacitor during periods of non-conduction by the stroboscopic device at a rate in the order of the reciprocal of the predetermined frequency, the second capacitor discharging through the stroboscopic device incident to the application of the pulse to the grid of the stroboscopic device, the discharge of the second capacitor causing momentary decay of the power supply voltage at the terminals to assure extinguishing of the thyratron and the stroboscope and substantially lowering the plate voltage of the amplifier to substantially prevent cyclical operation of the stroboscopic device by currents having frequencies above the predetermined value or by spurious currents.

References Cited in the file of this patent

UNITED STATES PATENTS

| | | |
|---|---|---|
| 2,383,405 | Merrill et al. | Aug. 21, 1945 |
| 2,449,651 | Hathaway | Sept. 21, 1948 |
| 2,521,141 | Allen | Sept. 5, 1950 |
| 2,798,379 | Merrill et al. | July 9, 1957 |